United States Patent
Kalkbrenner et al.

(10) Patent No.: US 10,371,501 B2
(45) Date of Patent: Aug. 6, 2019

(54) METHOD FOR DETERMINING HEIGHT INFORMATION OF A SAMPLE, AND SCANNING MICROSCOPE

(71) Applicant: Carl Zeiss Microscopy GmbH, Jena (DE)

(72) Inventors: Thomas Kalkbrenner, Jena (DE); Helmut Lippert, Jena (DE)

(73) Assignee: Carl Zeiss Microscopy GMBH, Jena (DE)

( * ) Notice: Subject to any disclaimer, the term of this patent is extended or adjusted under 35 U.S.C. 154(b) by 0 days.

(21) Appl. No.: 15/419,166

(22) Filed: Jan. 30, 2017

(65) Prior Publication Data
US 2017/0254640 A1 Sep. 7, 2017

(30) Foreign Application Priority Data
Mar. 7, 2016 (DE) .................. 10 2016 203 671

(51) Int. Cl.
*G01J 1/44* (2006.01)
*G01B 11/06* (2006.01)
(Continued)

(52) U.S. Cl.
CPC ...... *G01B 11/0608* (2013.01); *G01B 11/2518* (2013.01); *G01J 1/44* (2013.01);
(Continued)

(58) Field of Classification Search
CPC ............ G01B 11/0608; G01B 27/0927; G01B 21/0032; G01B 21/0028; G01B 21/008; G01B 11/2518; G01J 1/44; G01J 2001/446

See application file for complete search history.

(56) References Cited

U.S. PATENT DOCUMENTS

| 5,161,053 | A | * | 11/1992 | Dabbs | ............... G02B 21/0032 359/384 |
| 5,576,948 | A | * | 11/1996 | Stern | .................... G05B 19/408 382/145 |

(Continued)

OTHER PUBLICATIONS

Sri Rama Prasanna Pavani and Rafael Piestun, "Three dimensional tracking of fluorescent microparticles using a photon-limited double-helix response system," Opt. Express 16, 22048-22057 (2008).*
(Continued)

*Primary Examiner* — Dominic J Bologna
(74) *Attorney, Agent, or Firm* — Nixon Peabody LLP; Jeffrey L. Costellia

(57) ABSTRACT

The invention relates to a method for determining height information of a sample, and to a scanning microscope. The method comprises the following steps: generating an illumination spot; illuminating the sample with the illumination spot; capturing an image of a reflection of the illumination spot at the sample; evaluating the lateral distribution of the image; determining the height information from the lateral distribution; wherein the illumination spot has a three dimensional illumination pattern and/or the image in a detection beam path has a three dimensional detection pattern. The scanning microscope is characterized in that an illumination device (07) and/or a detector device comprise(s) a means for generating a three dimensional pattern with a change in the lateral intensity distribution that is asymmetrical along the optical axis, and an evaluation device is configured to determine height information from the detector signal.

13 Claims, 2 Drawing Sheets

(51) Int. Cl.
*G01B 11/25* (2006.01)
*G02B 21/00* (2006.01)
*G02B 27/09* (2006.01)

(52) U.S. Cl.
CPC ....... *G02B 21/008* (2013.01); *G02B 21/0028* (2013.01); *G02B 21/0032* (2013.01); *G02B 27/0927* (2013.01); *G01J 2001/446* (2013.01)

(56) References Cited

U.S. PATENT DOCUMENTS

| | | | | |
|---|---|---|---|---|
| 8,587,686 B1* | 11/2013 | Riza | ................ | G01S 17/89 348/222.1 |
| 2003/0002054 A1* | 1/2003 | Prinzhausen | ...... | G02B 21/0028 356/609 |
| 2006/0180581 A1* | 8/2006 | Swaringen | ............ | B23K 26/04 219/121.83 |
| 2009/0244260 A1* | 10/2009 | Takahashi | .......... | A61B 1/00172 348/45 |
| 2015/0029325 A1* | 1/2015 | Dholakia | ........... | G01N 21/6458 348/79 |

OTHER PUBLICATIONS

Baddeley, D., Cannell, M.B. & Soeller, C. Nano Res. (2011) 4: 589. https://doi.org/10.1007/s12274-011-0115-z.*
Alexander Jesacher, Monika Ritsch-Marte, and Rafael Piestun, "Three-dimensional information from two-dimensional scans: a scanning microscope with postacquisition refocusing capability," Optica 2, 210-213 (2015).*
"Three-Dimensional Super-Resolution Imaging by Stochastic Optical Reconstruction Microscopy", by Bo Huang, Wenqin Wang, Mark Bates, Xiaowei Zhuang, Science, Feb. 8, 2008 : 810-813.*
Jesacher et al., "Three-Dimendional Information for Two-Dimensional Scans: A Scanning Microscope With Postacquisition . . . ," Optica, vol. 2, No. 3, paged 210-213, Mar. 2015.

* cited by examiner

METHOD FOR DETERMINING HEIGHT INFORMATION OF A SAMPLE, AND SCANNING MICROSCOPE

CROSS-REFERENCE TO RELATED APPLICATIONS

This application claims priority from and the benefit of German Application No. 10 2016 203 671.8, which is hereby incorporated by reference in its entirety.

TECHNICAL FIELD

The invention relates to a method for determining topography information or height information of a sample, and to a scanning microscope.

BACKGROUND

For the characterization of technical surfaces and in particular for the derivation of roughness measurement values and also topographies, confocal microscopy is used nowadays as a standard method. The method is described for example in [M. Rohlres, J. Seewig, L "Optisches Messen technischer Oberflächen", ["Optical Measurement of Technical Surfaces"] Beuth Verlag GmbH, Berlin, 2009]. In many confocal systems, scanning of the sample here takes place in all three spatial directions, that is to say that point scanning systems are firstly involved in which an optical beam is guided (scanned) over the sample in the x/y direction. In order to derive the height information, a movement of the sample relative to the detector unit (in the z direction) is furthermore required. From the intensity maximum depending on the z position, it is possible to derive the height information and thus the topography for each x y location. In this case, by way of example, the "Centre of Gravity" method is typically used [Tiziani et al., Opt. Eng. 39, 32 (2000)]. One example of such a system is the LSM700 from Carl Zeiss Microscopy GmbH.

What is disadvantageous about this method is primarily the long time required by the additional z scan for a 3D topography recording. Moreover, the precision (accuracy of the height measurement) is greatly dependent on the setting accuracy of the sample surface relative to the detector unit and is thus always limited, or a high precision requires highly accurate and expensive actuating elements e.g. on a piezo basis.

BRIEF DESCRIPTION

The object of the invention is to simplify the topography determination of a sample when using a scanning microscope or to make it possible without a separate z scan. A partial object may be considered that of increasing the recording speed and/or the resolution.

The object is achieved by means of a method having the features of claim 1 and by means of a scanning microscope having the features of claim 8.

Advantageous configuration variants of the invention are specified in the dependent claims and in the following description.

The basic concept of the invention consists in using and evaluating in a scanning microscope, on the illumination and/or detection side, a three dimensional illumination pattern and/or detection pattern similar to a point spread function.

In one preferred embodiment, the illumination pattern and/or detection pattern have/has a great and unambiguous lateral variation of the intensity as a function of z (z direction along the optical axis). In this case, the unambiguous lateral variation of the intensity as a function of z should be understood such that the illumination pattern and/or detection pattern in each Z position allow(s) an unambiguous alignment to said Z position. In this case, the optical axis runs substantially parallel to a plane normal of a sample plane in which the sample is positioned.

In a method according to the invention, a three dimensional illumination pattern and/or a three dimensional detection pattern are/is generated. The sample is preferably scanned in a raster type fashion with an illumination spot, and in the process the illumination pattern is projected onto the sample and/or the image of the illumination spot in a detection beam path has a detection pattern.

As a result of the coding of the z information in the lateral variation of the illumination pattern, it is possible to read out the z information e.g. by means of a position sensitive detector directly for each raster position. Moreover, in a known manner, the total intensity information can be used for lateral or x/y or 2D image production.

Advantageously, in contrast to the confocal microscope, firstly no z scan is required (higher speed) and secondly a higher topography resolution is achieved.

In one advantageous embodiment, the illumination pattern and/or the detection pattern have/has a change in the lateral intensity distribution that is asymmetrical along the optical axis (z direction). In this case, the optical axis runs parallel to a plane normal of a sample plane in which the sample is positioned.

As a result of the coding of the z information in the lateral variation of the detection pattern, it is possible to read out the z information e.g. by means of a position sensitive detector directly for each raster position. Moreover, in a known manner, the total intensity information can be used for lateral or x/y or 2D image production.

A particularly simple realization of the illumination pattern can be effected by introducing a linear phase profile in one half of the pupil of the illumination spot. This can be realized for example by one glass wedge that covers one half of the pupil, or two oppositely directed wedges that each cover one half of the pupil.

In order to generate a corresponding three dimensional detection pattern, the glass wedge should be provided in the detection beam path.

In other embodiments, it is possible to generate the illumination pattern and/or detection pattern with a rotating intensity distribution e.g. by means of a laser. Generating the rotating intensity distribution necessitates a corresponding phase element in the illumination and/or detection beam path.

With the use of an illumination pattern which consists of 2 spots (Helix, PRILM), the (oppositely directed) signal of the 2 spots can be averaged in order to improve the signal quality. However, if each spot is evaluated individually, the lateral resolution is thereby increased. In this case, the z information can also be obtained from the position of a spot. At the same time, the separate evaluation also thus makes it possible to increase the image recording speed too, since effectively 2 spots, are used simultaneously for imaging.

Advantageously, here as well, in contrast to the confocal microscope, firstly no z scan is required (higher speed) and secondly a higher topography resolution is achieved.

The detection pattern can be implemented in the same way as the illumination pattern described. In particular, it can also be realized using identical means. This also applies to rotating intensity distributions of the detection light components, wherein the latter are generated only indirectly for example in the sense of a reflection at the sample by a laser.

A scanning microscope according to the invention firstly has, in a known manner, an illumination device for illuminating and/or exciting a sample with an illumination spot. It furthermore comprises a scanning apparatus for scanning the illumination spot over the sample, a detector device for detecting the illumination spot reflected and/or emitted from the sample, and an evaluation device for evaluating the signal of the detector device.

According to the invention, the illumination device and/or detector device comprise(s) at least one means for generating a three dimensional pattern with a change in the lateral intensity distribution that is asymmetrical along the optical axis. The evaluation device is configured to determine height information from the detector signal. This is possible using known means since the intensity distribution of the illumination pattern and/or of the detection pattern are known.

With the use of a laser as light source, interference effects can occur depending on the optical properties of the sample to be examined, said interference effects making it more difficult to analyse the detector signal. This can be avoided either by using a suitable light source (e.g. a superluminescence source) or by influencing the coherence of the laser.

In principle, the system can also be designed in a non descanned fashion, since no pinhole is required for the z resolution. However, it would then be necessary to employ a camera (pixel array) as detector since the reflected spot is then not stationary. The reflected PSF would then have to be evaluated for each camera image.

The method and/or the scanning microscope can also be implemented as a multi spot system for more rapidly capturing large sample regions. For this purpose, each of the plurality of illumination spots can be imaged onto a dedicated position sensitive detector (fast) or else all the illumination spots are imaged onto one camera and each illumination spot is assigned a dedicated ROI (region of interest) within which the reflected illumination pattern is then evaluated.

The advantages of the invention can be seen, in particular, in the fact that, as a result of the transfer of the z information to lateral intensity information, a higher information content is available for evaluation compared with the pure defocus information.

The coding of the z information in a lateral intensity variation allows the use of a segmented detector (PSD: Position Sensitive Detector). The topography microscopy (reflection) is generally not photon limited; under these conditions, a very high sensitivity can be achieved with the segmented detector.

A pinhole can be dispensed with, in principle, since the discrimination of off focus light components also results from the lateral form of the PSF or the differential signal. However, an additional pinhole may be advantageous for a better signal to noise ratio.

For the present invention, advantageously a z scan per pixel is no longer necessary, since the z information is present directly in the signal of the PSD.

When generating a height map (relative height information for different pixels), two situations can occur:

a) In the case of flat samples in which no height differences greater than the depth of focus occur, with the present invention a z scan is not necessary since the height information can be determined directly as it were in one go.

b) In the case of samples having pronounced height variations greater than the depth of focus, a z scan is admittedly still necessary. However, a very much greater z step size can be employed here in comparison with the prior art, as a result of which in turn time is gained.

Furthermore, advantageously, no computational operations are necessary; the data recording is only limited by the scanning method. Particularly since in general there is enough signal light present in material microscopy, the use of a resonance scanner and/or multi spot scanning is possible, as a result of which a huge gain in speed is achievable.

The invention can be realized for example in a customary confocal microscope by introducing the phase element into the illumination beam path and opening wide the confocal pinhole on the detection side, wherein a corresponding detector should be used. Alternatively, or additionally, the phase element can be introduced into the detection beam path.

BRIEF DESCRIPTION OF THE DRAWINGS

In order to describe the manner in which the above-recited and other advantages and features of the disclosure can be obtained, a more particular description of the principles described above will be rendered by reference to specific examples illustrated in the appended drawings. These drawings depict only example aspects of the disclosure, and are therefore not to be considered as limiting of its scope The principles are described and explained with additional specificity and detail through the use of the following drawings.

DETAILED DESCRIPTION OF ILLUSTRATED EXAMPLES

Figures 1, 2:
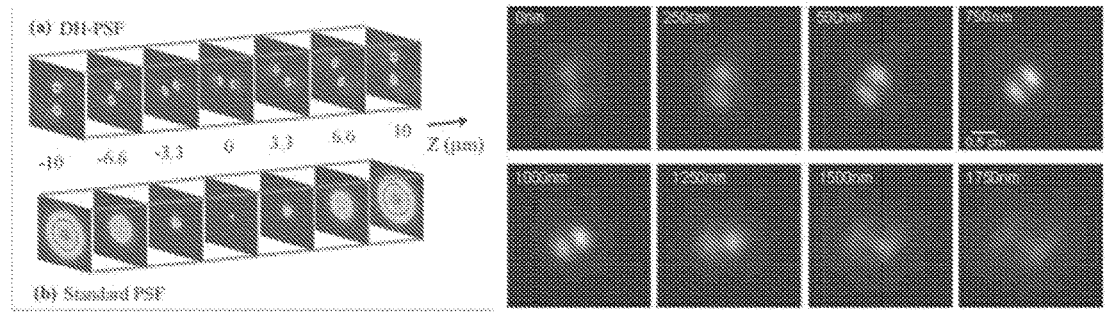
FIG. 1: shows various point spread functions.
FIG. 2: shows an illumination pattern or detection pattern in various z positions.

FIG. 1 shows various point spread functions (PSF) such as occur or are evaluated for example in the detection of a laser scanning microscope.

The figure shows at the bottom a standard point spread function such as arises as a result of diffraction at a pinhole. The illustration shows the lateral resolution as a function of the Z position.

The figure shows at the top a so called double helix point spread function (DH-PSF) such as is described e.g. in [Pavani et al., Optics Express 16, 26 (2008)] for 3-D data generation in super resolution microscopy (PALM). Such a point spread function that is asymmetrical in a lateral (X-Y)

and axial (Z) direction is preferably used as illumination pattern. It can likewise be used as detection pattern.

FIG. 2 shows a different illumination pattern or detection pattern, which was generated by the use of a glass wedge covering one half of the pupil in a laser scanning microscope. A similar detection point spread function is described in [Baddeley et al., Nano Res. 4, 589 (2011)].

According to the invention, such and similar point spread functions can be generated both in illumination and in detection and can be used as illumination pattern or detection pattern, wherein, with the use of laser sources, if appropriate, it is necessary to take account of the coherence in the sense of a point light source.

Figures 3, 4:
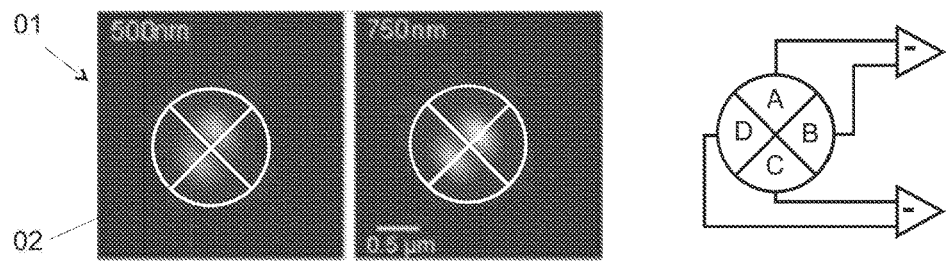
FIG. 3: shows one preferred embodiment of the evaluation of an illumination pattern reflected by a sample or of a detection pattern.
FIG. 4: shows a circuit diagram for the evaluation of the detector signals.

FIGS. 3 and 4 describe the measurement and evaluation principle with the use of an illumination pattern or detection pattern.

FIG. 3 shows a pattern 01 at two different Z positions represented by 500 nm and 750 nm. A detector is schematically depicted in the pattern. The detector is a position sensitive detector (PSD) and, in the example illustrated, a four quadrant photodiode 02. It can be discerned that the intensities in the respective quadrants in the different Z positions have different magnitudes.

FIG. 4 shows an exemplary evaluation circuit that forms a differential signal of in each case two quadrants. In the case of the present pattern having two symmetrical spots proceeding in opposite directions, the differential signal of the quadrants {A and B} and {C and D} would be identical and can be averaged in order to increase the sensitivity in one embodiment of the invention.

The normalised differential signals are formed as follows:

$$\frac{I_A - I_B}{I_A + I_B} \propto z$$

$$\frac{I_C - I_D}{I_C + I_D} \propto z$$

The summation information of all the quadrants would correspond to the intensity signal of the scanned point and be used to determine the overall image in a known manner.

Alternatively, and depending on the point pattern, the sum of two of the four quadrants suffices, that is to say that only one of the two spots is used; the lateral resolution is thus increased.

Figure 5:
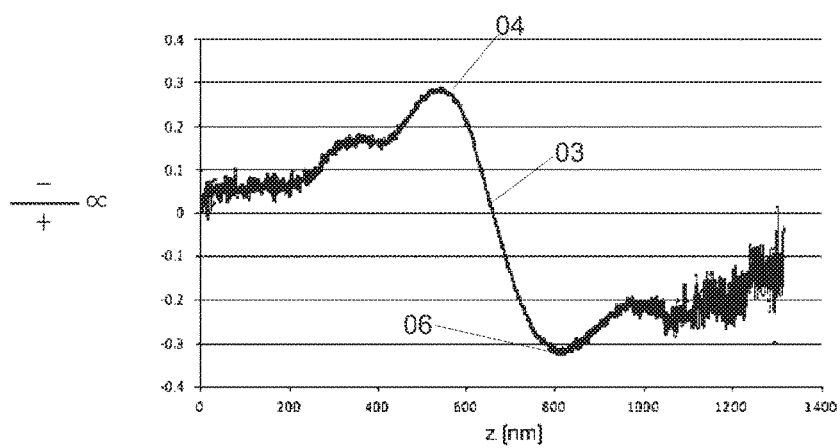
FIG. 5: shows an intensity signal of a detector device as a function of a topography (Z) of a sample.

FIG. 5 illustrates a signal profile of a pattern evaluated according to the above calculation.

A central region 03 between maximum 04 and minimum 06 exhibits a strictly monotonic behaviour with very high signal quality, which moreover is linear over a wide range. In this region 03, the z information can thus be unambiguously obtained directly from the detector differential signal. A non-linear behaviour (for example when a different type of illumination pattern is used) can also be mapped by corresponding gauging and calibrating curves which are sufficiently known to the person skilled in the art.

Figure 6:
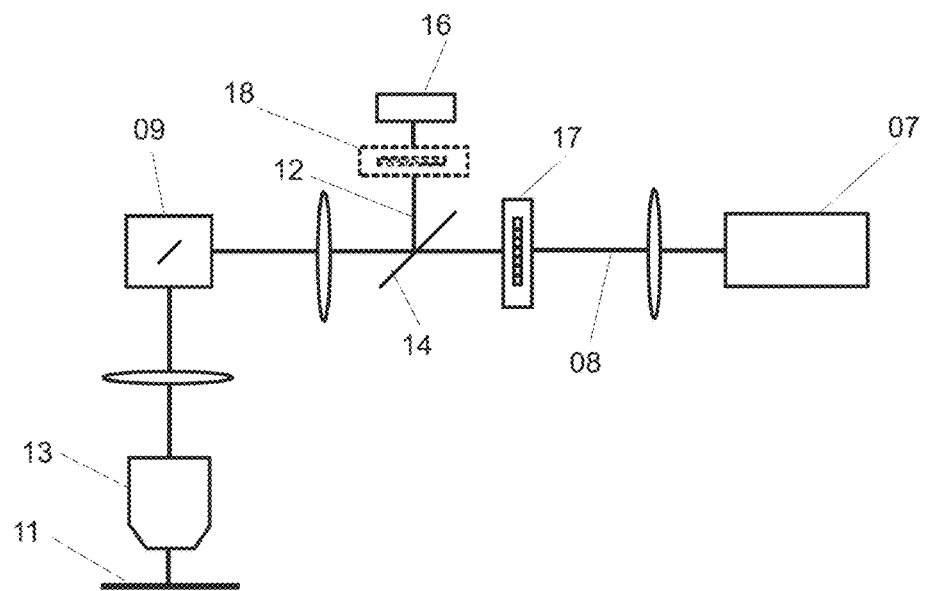
FIG. 6: shows a basic schematic diagram of a laser scanning microscope in a first preferred embodiment with an open control loop.

FIG. 6 shows a laser scanning microscope in a first preferred embodiment with an open control loop (open loop).

The laser scanning microscope is firstly constructed in a known manner. A laser 07 provides illumination light in an illumination beam path 08, said illumination light being scanned point by point onto a sample plane 11 by a scanner 09.

Light reflected and/or emitted by a sample positioned in the sample plane 11 is fed in an observation beam path 12 through an objective 13 and a beam splitter 14 to a detector 16. The detector 16 is a position sensitive detector (PSD).

A phase element 17 is provided at least in one of the two beam paths, in the illumination beam path or in the detection beam path, or in both beam paths, in order to generate an unambiguous intensity distribution, which is greatly variable as a function of z, transversely and parallel with respect to the optical axis. The phase element 17 can be for example a simple glass wedge as in [Baddeley et al., Nano Res. 4, 589 (2011)] or a complex phase mask as in [Grover et al., Biomedical Optics Express 2, 3012 (2011)]. The phase element 17 is situated in or near a conjugate pupil of the system in excitation and/or detection. A phase element 18 is illustrated by dashed lines in the figure; the phase element 18 can be used as an alternative or in addition to the phase element 17.

Alternatively, the phase element 17, 18 can also be a Spatial Light Modulator (SLM). If the latter acts in transmission (e.g. liquid crystal SLM), there is no change to the construction; if a reflection SLM (e.g. Micromirror-Array, Deformable Mirror) is involved, the beam path must be correspondingly folded.

A camera or a detector array can also be used instead of the detector 16. The number of pixels can be small (=fast); it suffices to image the reflected illumination pattern. Thus the entire image information of the illumination pattern can then be analysed.

A detector array as described in DE 10 2013 019 347 A1 is particularly suitable for this purpose. In this regard, e.g. a stored system PSF can be adapted.

Instead of the scanning movement, the sample can also be moved relative to the measuring head.

Figure 7:
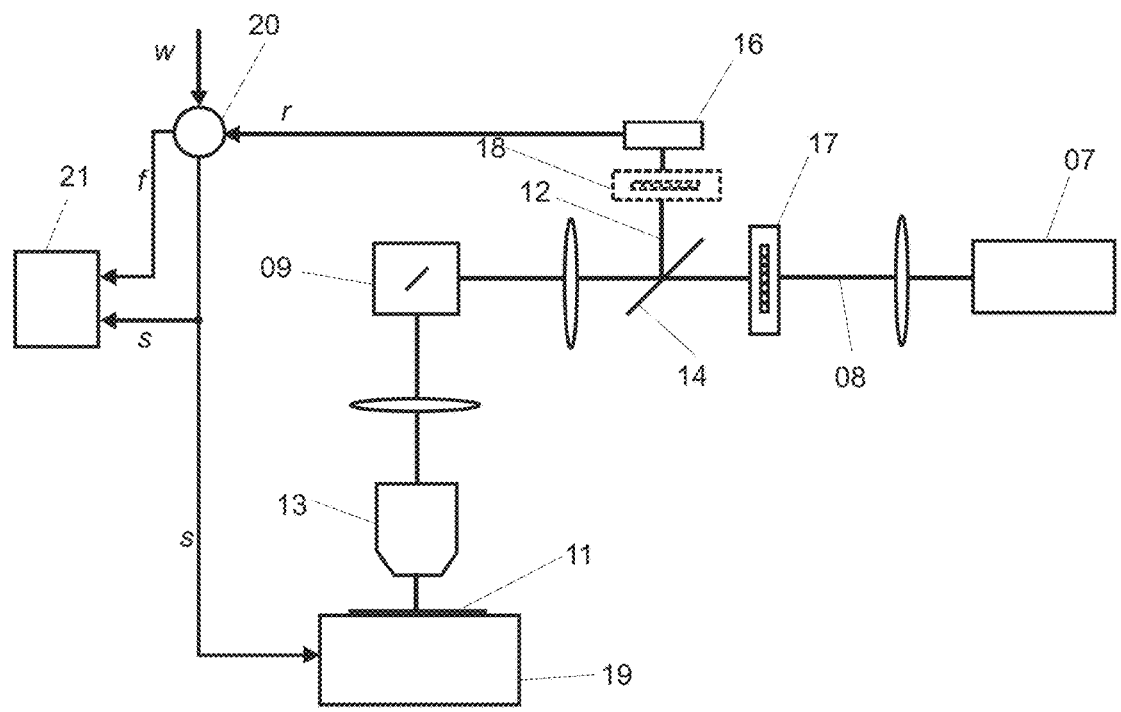
FIG. 7: shows a basic schematic diagram of a laser scanning microscope in a second preferred embodiment with a closed control loop.

FIG. 7 shows a system which is in principle of the same construction as shown in FIG. 6, but embodied as a closed control loop (closed loop). Identical reference signs have the same meaning as described above.

The system additionally comprises a piezo actuator 19 for adjusting the sample plane 11 in the z direction and a controller 20.

The controller 20 receives e.g. the differential signal of the detector 16, which is determined as described above, as controlled variable r. In order to keep this controlled variable at a set point value w (e.g. "0"), the controller 20 applies a control signal s to the piezo actuator 19. Said signal is directly proportional to z (topography) and is detected and evaluated by an evaluation unit 21. In this case, the evaluation unit 21 can have a dedicated signal processor for data processing. In addition, an error signal f (deviation from the controlled variable) can be detected and recorded, which error signal, e.g. with the use of a PI controller, to an approximation is proportional to the change in topography (derivation).

The advantage of this embodiment consists in a high sensitivity (=topography resolution) which results from the great gradient of the signal at the zero crossing (FIG. 5), and in a high operating range in the z direction. The latter is no longer provided by the depth of focus of the illumination pattern (e.g. ~1-1.5 μm at 100×0.9 NA), but rather by the movement range of the piezo actuator 19, which may be a few 10-100 μm. This mode by its nature is slower than the embodiment described in FIG. 6, owing to the closed loop control and the actuating time of the piezo actuator 19.

What is ideal is a demand controlled switching between the operating modes "open loop" (fast, limited in z) and "closed loop" (slow, large z operating range, sensitive).

In this embodiment, too, one phase element 18 is illustrated by dashed lines; it can be used as an alternative or in addition to the phase element 17.

The invention claimed is:

1. A method for determining height information of a sample, the method comprising:
    generating an illumination spot;
    illuminating the sample with the illumination spot;
    capturing an image of a reflection of the illumination spot at the sample;
    evaluating the lateral distribution of the image;
    determining the height information from the lateral distribution;
    wherein the illumination spot has a three dimensional illumination pattern and/or the image in a detection beam path has a three dimensional detection pattern.

2. The method of claim 1, wherein at least one of the illumination pattern and the detection pattern have a change in the lateral intensity distribution which is asymmetrical along the optical axis, wherein the optical axis runs parallel to a plane normal of a sample plane in which the sample is positioned.

3. The method of claim 1, wherein a phase profile is used for generating at least one of the illumination pattern and the detection pattern.

4. The method of claim 3, wherein the phase profile is linear.

5. The method of claim 1, wherein intensity information of the image is furthermore determined.

6. The method of claim 1, wherein the illumination pattern is generated by the use of a laser beam with a rotating intensity distribution.

7. The method of claim 1, wherein a plurality of illumination spots is scanned simultaneously over the sample plane.

8. A scanning microscope, comprising
    an illumination device for illuminating a sample with an illumination spot;
    a scanning apparatus for scanning the illumination spot over the sample;
    a detector device for the spatially resolved detection of the illumination spot reflected by the sample;
    an evaluation device for evaluating the signal of the detector device;
    characterized in that
    wherein at least one of the illumination device and the detector device is configured to generate a three dimensional pattern with a change in the lateral intensity distribution that is asymmetrical along the optical axis; and
    the evaluation device is configured to determine height information from the detector signal.

9. The scanning microscope of claim 8, wherein at least one of the illumination device and the detector device comprises a phase element configured to generate the three dimensional pattern.

10. The scanning microscope of claim 9, wherein the phase element comprises a glass wedge which is arranged in a pupil plane of the scanning microscope, and covers at least part of the illumination spot and/or of the image.

11. The scanning microscope of claim 10, wherein the glass wedge is a first glass wedge and the phase element comprises a second glass wedge, wherein the first glass wedge and the second glass wedge are arranged in opposite directions and each cover half of the illumination pattern.

12. The scanning microscope of claim 8, wherein at least one of the illumination device and the detector device comprises a laser beam with a rotating intensity distribution that is configured to generate the illumination pattern is.

13. The scanning microscope of claim 8, wherein the detector device is a quadrant photodiode.

* * * * *